United States Patent [19]
Marroni, Jr. et al.

[11] 3,771,499

[45] Nov. 13, 1973

[54] STEAM GENERATOR CRADLE SUPPORT

[75] Inventors: Michael A. Marroni, Jr., Weatogue; Daniel A. Peck, South Windsor, both of Conn.

[73] Assignee: Combustion Engineering Inc., Windsor, Conn.

[22] Filed: Dec. 30, 1971

[21] Appl. No.: 213,865

[52] U.S. Cl. ................................. 122/510, 176/87
[51] Int. Cl. ............................................... F22b 37/24
[58] Field of Search ..................... 122/510; 176/38, 176/87; 248/1

[56] References Cited
UNITED STATES PATENTS

| | | | |
|---|---|---|---|
| 3,123,328 | 3/1964 | Trickett et al. ....................... | 176/87 |
| 3,192,121 | 6/1965 | Challender et al. ................. | 122/510 |
| 3,395,076 | 7/1968 | Ruppen ................................ | 176/38 |
| 3,413,960 | 12/1968 | Feliks et al. ......................... | 122/510 |

Primary Examiner—Kenneth W. Sprague
Assistant Examiner—James C. Yeung
Attorney—Eldon H. Luther et al.

[57] ABSTRACT

Means for laterally supporting a nuclear steam generator against the effect of seismic loadings or other shock loadings imparted by external or internal causes are disclosed. Support is provided by means of a stiffening structure incorporating a shock suppressor apparatus which operates through the lever arm of a mechanical linkage. The apparatus is designed to permit unrestrained lateral movements caused by thermal growth of the equipment, but undesired lateral loadings, such as those caused by earth tremors or equipment failure, automatically render the apparatus operative to support the steam generator against these loadings.

5 Claims, 8 Drawing Figures

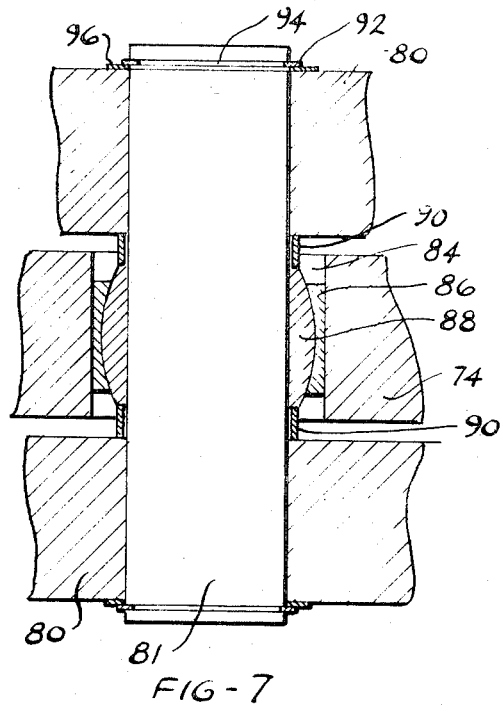
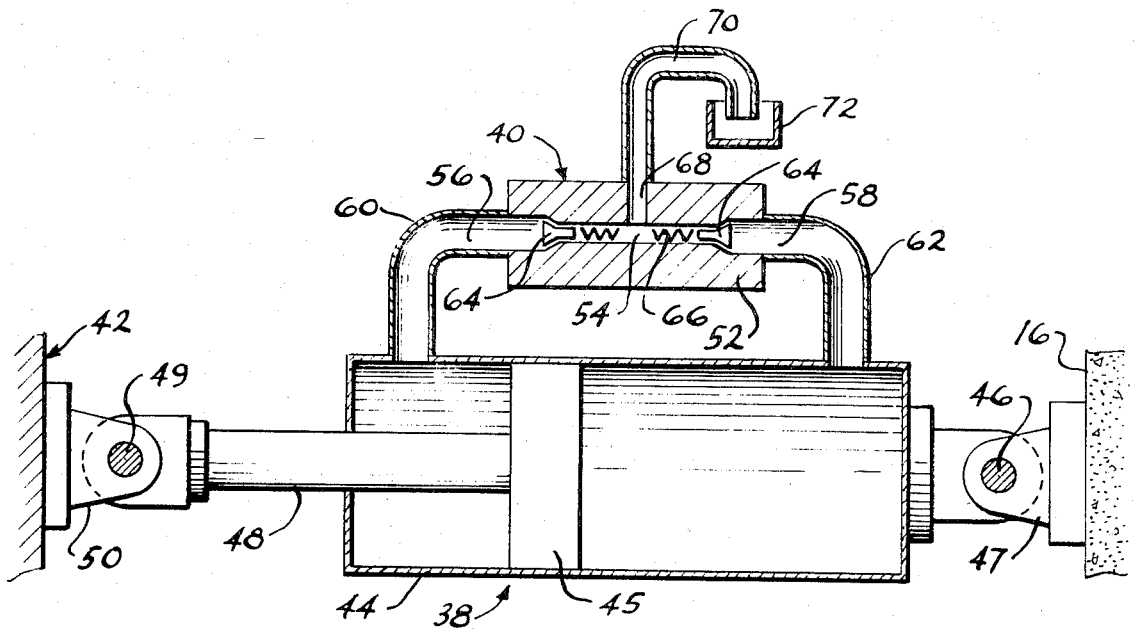

STEAM GENERATOR CRADLE SUPPORT

BACKGROUND OF THE INVENTION

Nuclear power plants of the pressurized water type comprise a nuclear reactor and one or more steam generators that utilize primary coolant, in the form of pressurized water, from the reactor to transform a secondary liquid, normally water, into vapor for operating a prime mover or the like. In the construction of these plants, the vapor generators, which usually comprise vertically elongated pressure vessels, require support means to prevent the vessels from toppling in the event they are subjected to excessive shock loadings as may be developed by earth tremors or as a result of equipment failure or unusual operational transients. The support apparatus that is utilized to provide this lateral support must be such as will permit the vessel to freely undergo thermal growth without imparting undue stress to any of its component parts. At the same time, it must be instantaneously effective to provide lateral support for the vessel when a need for such support arises.

Shock suppressor apparatus has been developed that satisfactorily performs this function. This apparatus commonly comprises an expandable support member including a hydraulic piston-cylinder set and a control valve that operates the set such that its effective length can be adjusted in response to thermally induced movements in the steam generator. The described apparatus can instantaneously be rendered rigid thus to become a load support member when the supported vessel is subjected to extraordinary loads as may be caused by earth termors or equipment failure.

As the capacity and size of vapor generator vessel currently contemplated for use in nuclear power plants is increased, the load bearing capability of the support apparatus must be accordingly increased. Such load increases have to date, been accommodated by increasing the size and number of supports employed. Since the cost of the described support apparatus and its ancillary equipment varies exponentially with the size of the apparatus, signficant savings can be realized by rendering the operation of the above-described support apparatus more efficient.

It is to the development of an improved form of shock load supports for nuclear steam generators therefore that the present inventions are directed.

SUMMARY OF THE INVENTION

According to the invention means are provided to increase the load carrying capacity of shock suppressor apparatus in order to reduce the expense attendant with the use of such equipment in nuclear power plants. The invention involves the use of lever mechanism interposed between the connection of the shock suppressor apparatus and the vapor generator vessel such that the loads carried by the apparatus are reduced in proportion to the effective length of the lever arm provided by the mechanism.

The lever mechanism is of unique design and equipped to accommodate thermal growth and other normal translatory motion of the vessel in an unobstructed manner. Motion produced by the thermal expansion and contraction of the reactor system components can occur in a totally unrestricted manner. However, the shock suppressor apparatus can effectively operate through the lever mechanism instantaneously upon the occurrence of an extraordinary load upon the vessel that would otherwise tend to topple it.

For a better understanding of the invention, its operating advantages and the specific objects obtained by its use, reference should be made to the accompanying drawings and description which relate to various embodiments of the invention.

DESCRIPTION OF THE DRAWINGS

FIG. 7 is a sectional view taken along line 7—7 of FIG. 3.

FIG. 8 is a schematic representation of the shock suppressor apparatus utilized in the present invention.

DESCRIPTION OF THE PREFERRED EMBODIMENT

Figure 1:
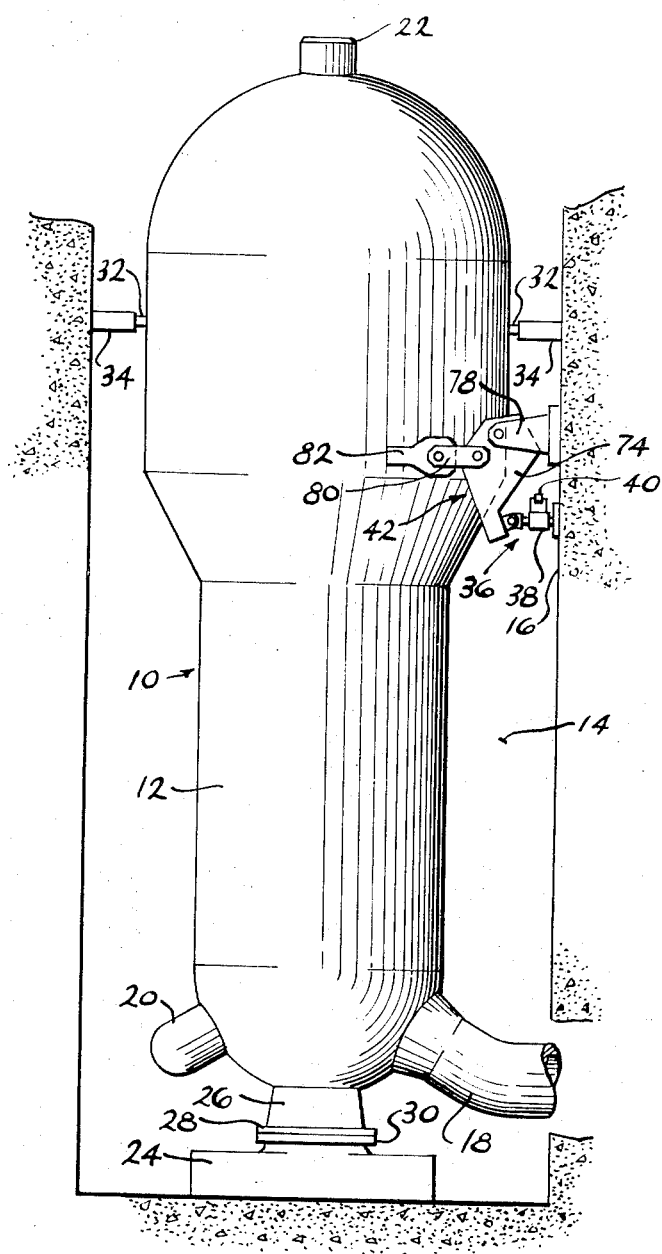
FIG. 1 is an elevational view of a nuclear vapor generator organization utilizing support apparatus constructed according to the present invention.
Figure 2:
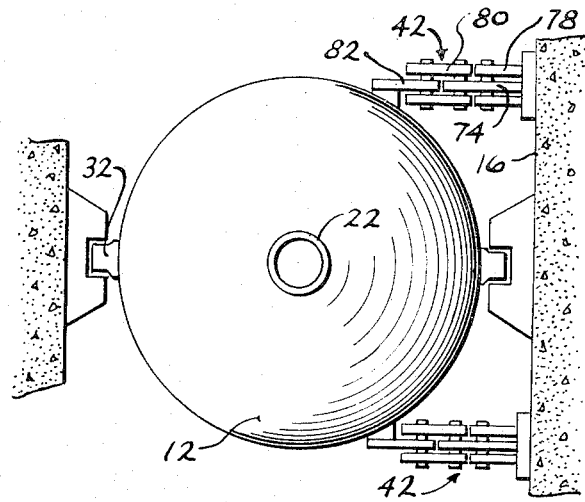
FIG. 2 is a plan view of the vapor generator organization of FIG. 1.

In FIGS. 1 and 2 of the drawings there is shown a nuclear operated vapor generator installation 10 embodying the present invention. It comprises a vertically elongated, cylindrical pressure vessel 12 disposed upon the floor 13 of a dry well 14 defined by containment structure 16. The pressure vessel 12 contains the operating parts of the vapor generator by means of which high temperature coolant fluid from a nuclear reactor (not shown) is placed in heat exchange relation with a secondary liquid, commonly water, to transform the same into vapor. Circulation of the coolant fluid between the vapor generator and the reactor is effected by means of supply and return pipes, 18 and 20 respectively. A vapor outlet nozzle 22 is provided at the top of the vessel to conduct vapor produced therein to a point of use.

The vessel 12 is vertically supported upon a pedestal 24 disposed upon the floor 13 of the dry well 14. The vessel 12 is connected to the pedestal 24 by means of a frusto-conical support skirt 26 that is weldedly attached to the bottom end of the vessel. As shown, the skirt 26 is connected about its lower end 28 by appropriate fasteners (not shown) to an upwardly extending portion 30 of the pedestal 24.

It will be appreciated that, as heat is added or removed from the vapor generator, the vessel 12 will be caused to undergo thermal expansion or contraction that occurs in both the vertical and lateral directions. Also, the vessel 12 will experience some lateral translatory motion with respect to the floor 13 of the dry well 14 due to the motion imparted to it as a result of the thermal expansion or contraction of the supply pipe 18. Therefore, in order to assist in maintaining the vertical alignment of the vessel 12 during these periods of thermal growth, a pair of opposed guides may be provided adjacent the upper end of the vessel. In the preferred embodiment, these guides comprise a pair of keys 32 attached to the external surface of the vessel at diametrically opposed sides thereof and spaced guide members 34 secured to the inner surface of the containment structure 16 and between which the keys 32 are free to slide. The guides are arranged to permit translatory motion of the vessel 12 in the direction of the axis of the supply pipe 18 but to prevent motion in any other lateral direction.

The means provided to laterally support the vapor generator vessel 12 against undue shock loadings include a shock suppressor mechanism, indicated generally as 36, that includes hydraulic piston-cylinder set 38, control valve 40, and lever mechanism 42, constructed according to the present invention. The hydraulic piston-cylinder set 38 includes a cylinder 44 containing a reciprocatable piston 45 to which a piston rod 48 is attached. The closed end of the cylindr 44 is pivotally attached to the wall of the containment structure 16 by means of a connection including pin 46 and clevis 47. At the other end of the piston-cylinder set 38, the piston rod 48 is connected for pivotal movement to the lever mechanism 42 by means of another connection including pin 49 and clevis 50. As shown, the piston-cylinder set 38 operates as an expandable link that permits unrestrained lateral movement of the vessel 12 during periods of thermal transients but which is effective to provide rigid support for the vessel when the same is subjected to undue shock loading.

The piston-cylinder set 38 is caused to operate in the described manner under the influence of the operation of the control valve 40. As shown in FIG. 8, the valve 40 comprises a body 52 having a through passage 54 terminating at each end in enlarged diameter chambers 56 and 58. The chambers 56 and 58 connect with the cylinder 44 on either side of the piston 45 by appropriate hydraulic lines indicated as 60 and 62, respectively. The chambers 56 and 58 each contain a poppet valve 64 that is biased to the open position by means of a spring 66. The characteristics of the spring 66 are such that the respective poppets 64 will be held in an open position during periods of normal translational activity by the vapor generator vessel 12. During this time, movement of piston 45 will effect substantially unrestricted flow of hydraulic fluid through the lines 60 and 62 and the open poppet valves 64 from one side of the piston to the other. To accommodate the difference in cylinder volume on the respective sides of piston 45 due to the presence of the piston rod 48, the valve 40 is provided with a bleeder port 68 and line 70 that communicates with a reservoir 72.

It will be appreciated that, upon the occurrence of a shock load in the system, the described apparatus is arranged to become a rigid load support member capable of withstanding any lateral loads that may be imparted to the vessel. This function is achieved by reason of the fact that the imposition of a shock load upon the system results in the rate of flow of hydraulic fluid flowing through the control valve 40 being increased to a level at which the resulting pressure on the affected poppet 64 is sufficiently great to overcome the force of its associated spring 66. When this occurs, the poppet 64 will close thereby preventing further flow of hydraulic fluid to or from the cylinder thus rendering the entire shock suppressor apparatus rigid between the vapor generator vessel 12 and the containment structure 16.

In order to reduce the load carrying capacity of the shock suppressor apparatus, the lever mechanism, indicated generally as 42, is employed. This mechanism comprises a lever arm 74 formed of a vertically disposed plate here shown as being of composite shape but which may be formed of a simple rectangle if desired. The lever arm 74 is mounted for pivotal movement by means of a pin connector 76 attaching the plate to a clevis 78 which is, in turn, secured to the facing wall of the containment structure 16. The lever arm 74 is connected to the vapor generator vessel 12 by means of a pair of oppositely spaced links 80 that are pin connected at one end by a pin 81 mounted in clevis 82 that is appropriately secured to the external surface of the vapor generator vessel 12. At their other ends the links 80 are secured by a similar pin 81 to the lever arm 74. The connection of the links 80 to the lever arm 74 is preferably at a location between the connection of the pivot pin 76 and the free end of the lever 74 that attaches the connecting rod 48 of the shock suppressor apparatus 36. The points of connection of the links 80 and shock suppressor apparatus to the lever 74 are preferably selected to produce a mechanical advantage of the order of about 5 to 1. Thus, in the arrangement shown, the distance between the pin 76 and the point of attachment of ths shock suppressor apparatus 36 will be five times the distance between the pin 76 and the pin 81.

It should be obvious that, in the preferred embodiment, although the links 80 are connected to the lever arm 74 at a point intermediate the pin 76 and the connection of the shock suppressor mechanism 36, such connection could be made on the opposite side of the pin 76 without departing from the scope of the invention.

To render the lever mechanism 42 able to accommodate the relative movements that occur between the vapor generator vessel 12 and the containment structure 16 during periods of normal thermal expansion and constraction the pin connections 81 that connect the links 80 at their opposite ends to the lever arm 74 and the clevis 82 are mounted for angular movement. FIG. 7 illustrates the pin connection between the links 80 and the lever arm 74. As shown, the pin 81 extends through aligned openings provided in the links 80 and lever arm 74. The opening, indicated as 84, in the lever arm 74 is of enlarged diameter to accept the outer race 86 of a spherical bearing that is press fit or otherwise secured in the opening. The inner face 88 of the spherical bearing is mounted upon the pin 81 intermediate its ends and cooperates, as is well known, with the outer race to permit the pin 81 to move relative to the lever arm 74. Cylindrical spacer sleeves 90 are provided that abut between the inner bearing race 88 and the respective links 80 to maintain the clearance spacing between the links and the lever arm. Attachment of the ends of the pin 81 to the respective links 80 is effected by means of annular lock rings 92 that engage the pins in annular grooves 94 provided therein to receive the rings. As shown, spacer washers 96 may be provided between the rings and the outer surface of the links.

The pin 81 connecting the other ends of the links 80 to the clevis 82 utilizes a similar spherical bearing assembly whose description is omitted here for the sake of brevity.

Figure 4:
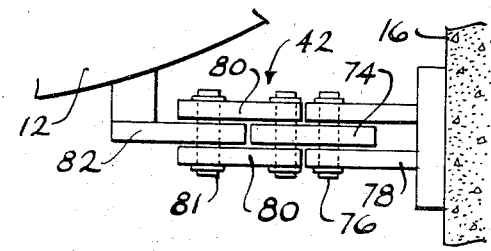
FIG. 4 is a view taken along line 4—4 of FIG. 3.
Figure 6:
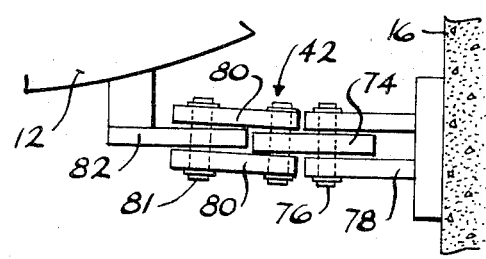
FIG. 6 is a view taken along line 6—6 of FIG. 5.
Figure 3:
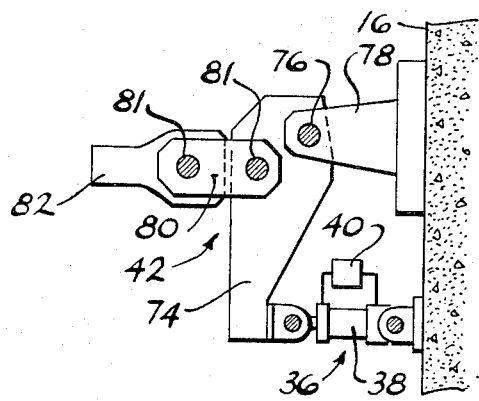
FIG. 3 is an enlarged illustration of the support apparatus of FIG. 1 shown in the "hot" position.
Figure 5:
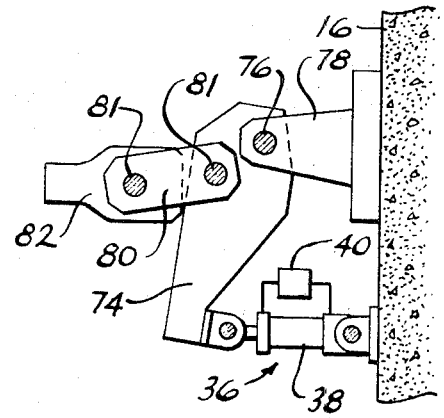
FIG. 5 is a view similar to FIG. 3 illustrating the support apparatus in the "cold" position.

The operation of the hereindescribed support mechanism is as follows. Assuming the power plant is in a shutdown condition and that the vapor generator vessel 12 is therefore cold, the operating parts of the lever mechanism 42 are disposed as shown in FIGS. 5 and 6. As the power plant is placed in operation and heat is applied to the system including the supply pipe 18 and the vapor generator vessel 12, the lever mechanism 42 will undergo a slight amount of relative movement under the influence of the thermal growth occurring in the vessel 12 and as a result of the translatory motion imposed on it due to the expansion occurring in the supply line 18. With the power plant up to load the lever mechanism 42 will assume a position as shown in FIGS. 3 and 4 of the drawing. As was explained hereinbefore, the movement occurring in the lever mechanism is imparted to the shock suppressor apparatus 36 in an unrestricted manner due to the operation of the piston-cylinder set 38 and the control valve 40.

Should the vapor generator vessel 12 be subjected to excessive transverse loading, as for example loading caused by an earth tremor, the poppet 64 on the affected side of the control valve 40 will be caused to close thereby rendering the support mechanism rigid. When this occurs, the loading imposed upon the vessel 12 is transmitted through the clevis 82 and link 80 to the pivot pin 76 and shock suppressor 36. From these members the load is further transmitted through the respective clevises to the containment structure 16. Since the load is transmitted to the shock suppressor mechanism 36 through the lever arm 74 the load imposed upon the mechanism 36 will be reduced in proportion to the dimensions of the mechanical linkages.

Thus it is evident that by providing a vapor generator lateral support system utilizing a lever mechanism as embodied in the present invention the stiffness of the support system can be significantly increased. It necessarily follows that shock suppressors of reduced load bearing capacities can be utilized to support a vapor generator vessel of a given size against excessive lateral shock loadings as compared with shock suppressor apparatus utilized in arrangements of the prior art. Concomitantly, the shock suppressors can be of reduced size and/or fewer in number thereby reducing the fabrication costs of the support system.

Additionally, further saving in fabircation costs are realized by virtue of the fact that the structural requirements of the ancillary equipment required for use with the shock suppressors are also reduced. For example, the size and number of clevis connections attaching the shock suppressors are reduced. Also, the load support capability of the adjacent concrete containment structure can be materially reduced.

It will be understood that various changes in the details, materials, and arrangements of parts which have been hereindescribed and illustrated in order to explain the nature of the invention, may be made by those skilled in the art within the principle and scope of the invention as expressed in the appended claims.

What is claimed is:

1. In a nuclear power plant, the combination comprising:
   a. a vertically disposed pressure vessel defining a vapor generator subject to thermally induced contraction, expansion and translatory movement;
   b. containment structure surrounding said pressure vessel in spaced relation thereto:
   c. means for bottom supporting said vessel and
   d. means for laterally supporting said vessel against excessive shock loadings comprising:
      i. a lever arm pivotally mounted to said containment structure.
      ii. a connecting link attaching said vapor generator to said lever arm, and
      iii. shock suppressor mechanism connected between said lever arm and said containment structure, the point of connection of said shock suppressor mechanism to said lever arm being spaced a greater distance from said lever arm pivot mounting than the point of connection of said connecting link.

2. Apparatus as recited in claim 1 wherein said connecting link is pin connected at its opposite ends to said pressure vessel and to said lever arm respectively, the connection of said pins being such as to permit relative angular movement between said connecting link and the said members to which it is connected.

3. Apparatus as recited in claim 2 wherein the connection of said link to the respective members includes a spherical bearing having its inner race mounted on the connecting pin and the outer race secured to the associated member.

4. Apparatus as recited in claim 2 wherein said shock suppressor mechanism comprises an expandable connection between said containment structure and said lever arm, and further including:
   a. means permitting substantially unimpeded expansion and contraction of said expandable connection during periods of normal thermally induced movement of said pressure vessel; and
   b. means rendering said expandable connection rigid upon application of a predetermined shock loading to said vapor generator.

5. Apparatus as recited in claim 4 wherein said shock suppressor mechanism comprises:
   a. a fluid operated piston-cylinder set connected between said lever arm and said containment structure;
   b. a pair of lines for conducting operating fluid to and from the cylinder of said set on opposite sides of the piston thereof;
   c. a control valve interconnecting said lines including a through passage to the ends of which said lines are attached; and
   d. poppet valves in said control valve operative with respect to each of said lines to permit the substantially unobstructed through flow of operating fluid during periods of normal plant operation and to effect rapid filling of said cylinder with operating fluid upon the occurrence of excessive shock loads upon said vessel.

* * * * *